United States Patent [19]

Burgin et al.

[11] Patent Number: 5,500,284

[45] Date of Patent: Mar. 19, 1996

[54] COMPOSITE POLYOLEFIN FILMS SUITABLE FOR PACKAGING

[75] Inventors: Emanuele Burgin, Bologna; Giacinto Serrao, Milan, both of Italy

[73] Assignee: Montell North America Inc., Wilmington, Del.

[21] Appl. No.: 358,281

[22] Filed: Dec. 19, 1994

[30] Foreign Application Priority Data

Dec. 27, 1993 [IT] Italy .................. MI93A2741

[51] Int. Cl.$^6$ .................. B32B 7/12; B32B 27/08
[52] U.S. Cl. .................. 428/349; 428/516; 428/517; 428/910
[58] Field of Search .................. 428/516, 910, 428/517, 349

[56] References Cited

U.S. PATENT DOCUMENTS

| | | | |
|---|---|---|---|
| 4,894,421 | 1/1990 | Kioka et al. | 525/243 |
| 5,286,552 | 2/1994 | Lesca et al. | 428/220 |
| 5,286,564 | 2/1994 | Cecchin et al. | 428/402 |
| 5,300,365 | 4/1994 | Ogale | 428/461 |
| 5,302,454 | 4/1994 | Cecchin et al. | 428/402 |
| 5,342,695 | 8/1994 | Tsurutani et al. | 428/516 |

FOREIGN PATENT DOCUMENTS

| | | |
|---|---|---|
| 0095299 | 9/1984 | European Pat. Off. . |
| 0252718 | 1/1988 | European Pat. Off. . |
| 0533493A1 | 3/1993 | European Pat. Off. . |
| 1566239 | 4/1980 | United Kingdom . |
| WO91/11324 | 8/1991 | WIPO . |

*Primary Examiner*—P. C. Sluby

[57] ABSTRACT

Disclosed are composite films including:

A) a single- or multilayer bioriented film, where the single layer or at least one layer of the bioriented film is propylene crystalline homopolymer; and B) a single- or multilayer cast film, wherein the single layer or at least one layer of said cast film is a layer of a composition including: I) propylene crystalline homopolymer, or a crystalline copolymer of propylene with ethylene and/or a $C_4$–$C_8$ α-olefin; II) a copolymer fraction containing propylene and ethylene, insoluble in xylene at ambient temperature; III) a copolymer of ethylene with propylene and/or a $C_4$–$C_8$ α-olefin and soluble in xylene at ambient temperature.

11 Claims, No Drawings

COMPOSITE POLYOLEFIN FILMS SUITABLE FOR PACKAGING

The present invention relates to composite films comprising two films coupled together, each of them having one or more layers. More particularly, the present invention relates to polyolefin composite films having improved tear and perforation resistance at low temperatures, improved resistance of the seal to the pressure exercised on it and processability when using packaging machines that fill either vertically or horizontally.

The composite films described below are particularly suitable for use in the packaging field. In particular, because of their mechanical and physical properties, the films of the present invention are suitable for food packaging, especially for the production of bags to be used for solid and/or liquid products, and/or to preserve products that must be kept at low temperatures.

Already commonly used are polyolefin films coupled with films made of materials of another nature, to produce composite films that are used, among other things, in the food packaging field. For example, used at present are composite films comprising a polyethylene (such as LDPE, for example) or polypropylene film and a polyamide or polyethylene terephthalate film. Due to the particular selection of the materials comprising said films and because of their properties, they can be adequately used for the production of bags using vertical or horizontal fill machines.

Moreover, already known in the art are also composite films comprising solely polypropylene films, as known, for example, from European patent application EP-A-533 493. Said EP-A-533 493 patent application describes composite films produced by coupling together two or more films, with at least one of them comprising an amorphous polyolefin, optionally containing crystalline polypropylene, and one or more crystalline polypropylene films. Said composite films, as well as the films that comprise them, are nonoriented films, and in the description it is never suggested that one of the films comprising the composite films can be subjected to an orientation process. Therefore, the composite films described in said patent application, not having the properties and characteristics of the films of the present invention, are not suitable for the specific applications that the films of the present invention are destined for.

Composite films are also described in international patent application WO 91/11324, whose object, among other things, includes polypropylene composite films with high mechanical resistance. To this end said patent application describes oriented composite films comprising a single layer polypropylene base film; said base film, that can be mono- or bioriented, is covered on one or both sides with a single layer film of an ethylene-propylene copolymer. The selection of said copolymer is made in such a way that the polymer of the base film has a melting point higher than the one of the film with which it is covered. The multilayer film thus obtained is then subjected to an orientation process.

The composite films described in the above mentioned patent application WO 91/11324 cannot be used for the applications foreseen for the composite films of the present invention since when said films are bonded together, the resulting seals are not sufficiently resistant to the pressure exercised on them by the liquid products preserved in bags manufactured from said composite films. Moreover, the generic ethylene-propylene copolymer utilized for the production of the film used to cover the base film of patent application WO 91/11324, does not have the characteristics necessary to guarantee the performances required, such as, for example, suitability for the use in vertical (or horizontal) fill machines, high tear resistance of the film even at low temperatures, and suitability for use in contact with foods.

A new composite film has now been found that comprises only polyolefin films, and specifically comprises a bioriented film coupled to a polyolefin cast film, said film being particularly suitable for use with vertical (or horizontal) fill machines thanks to the wide interval between the melt point of the bioriented film and the S.I.T. (Seal Initiation Temperature) of the cast film to which the bioriented film is coupled. The increase of said interval (referred to as heat-sealability window) reduces the risk of the undesired phenomenon consisting of the possible melting, or only softening, of the layer of film directly in contact with the sealing bars of the machines used. Thus, the risk of damaging the film during production, which renders it unusable, with consequent economic disadvantages is reduced or eliminated. Moreover, a broader sealability window allows for a wider range of the temperature at which the sealing bars of the vertical (and horizontal) fill machines operate, which in turn allows the modification of other production parameters in favor of improved productivity (for example, an increase in film speed and less precise regulation of the operating temperature of the sealing bars.)

Another advantage of the films of the present invention is that when they are sealed, said seals offer high stress resistance (about 1.5–2 kg/cm, for example), thus making it possible to use said films for the production of bags destined for liquids.

Moreover, the film of the present invention displays good tear resistance even at low temperatures, and is suitable for use in the food packaging field.

Therefore, the present invention provides a composite film comprising:

A) a single- or multilayer bioriented film wherein the single layer, or at least one layer of said bioriented film is of propylene crystalline homopolymer; and B) a single- or multilayer cast film wherein the single layer or at least one layer of said cast film is of a composition comprising a component $B_1$ consisting of:
  I) 10–60, preferably 15–55, parts by weight of a propylene crystalline homopolymer with an isotactic index greater than 80, preferably from 85 to 98, or a crystalline copolymer of propylene with ethylene and/or a $C_4$–$C_8$ α-olefin, containing more than 85% by weight, preferably from 90 to 99% by weight of propylene, and having an isotactic index greater than 85;
  II) 5–25, preferably 5–20, parts by weight of a copolymer fraction containing propylene and ethylene and insoluble in xylene at ambient temperature; and
  III) 20–70, preferably 20–65, parts by weight of a copolymer of ethylene with propylene and/or a $C_4$–$C_8$ α-olefin containing less than 70% by weight, preferably from 10 to 60%, most preferably from 12 to 55%, of ethylene, optionally containing small quantities of a diene, and soluble in xylene at ambient temperature.

Preferably, the propylene crystalline homopolymer comprising the single layer or at least one layer of the bioriented film (A) is an isotactic polypropylene having a Melt Flow Rate ranging from 1.5 to 3.5 g/10 min which displays, after conversion to film and biorientation, an isotactic index ranging from 90 to 99, preferably from 94 to 98.

Film (A) is preferably a triple-layer film where the outer layers are the same in terms of composition and the inner layer is different. Preferably in said structure the outer layers comprise a propylene random copolymer (bi- or terpolymer), while the middle layer is a propylene crystalline homopolymer.

The above mentioned propylene random copolymer constituting the possible outer layers of film (A) is preferably a copolymer of propylene with ethylene and/or a $C_4$–$C_8$ α-olefin.

If film (B) is multilayer it is preferably triple-layer. In this case the outer layers comprise a propylene homopolymer, or preferably, a random copolymer (bi- or terpolymer) of propylene with ethylene and/or a $C_4$–$C_8$ α-olefin.

The $C_4$–$C_8$ α-olefins suitable for copolymerization with propylene to obtain the copolymers which can be comprised in the films (A) and (B) used in the present invention comprise both linear and branched α-olefins; preferred examples are: 1-butene, 1-pentene, 1-hexene, 3-methyl-1-pentene, 4-methyl-1-pentene and 3-methyl-1-hexene. Particularly preferred is 1-butene.

Examples of component $B_1$ are described in published European patent applications EP-A-400333 and EP-A-472946 in the name of the Applicant.

The composition which constitutes film (B) can comprise the $B_1$ component as the only polymer in the composition itself, or can also include an additional polymer or polymer composition, preferably a propylene isotactic homopolymer, in quantities that preferably do not exceed 60%, more preferably hot greater than 45%, of the total mixture. Preferably said isotactic propylene homopolymer has a melt flow rate (M.F.R.) ranging from 6 to 12, more preferably 8–10, g/10 min, and an isotactic index ranging from 90 to 99.

The total content of polymerized ethylene in component $B_1$ preferably ranges from 10 to 40% by weight. Fraction II of component $B_1$ is a crystalline fraction that in addition to the ethylene can also contain propylene and/or a $C_4$–$C_8$ α-olefin selected from the ones mentioned above, and minor quantities of a diene. The quantity of diene optionally present in fractions II and III of component $B_1$ preferably ranges from 0.5 to 10% by weight with respect to the sum of fractions II and III. Examples of said dienes, conjugated or not, are: 1,3-butadiene, 1,4-hexadiene, 1,5-hexadiene, 1-ethylidine-1-norbornene.

If film (A) is a triple-layer film, the percentage ratios among the thicknesses of the three layers vary from 2/94/2 to 25/50/25. The preferred ratios are from 4/92/4 to 10/90/10.

If film (B) is a triple-layer film, the percentage ratios among the three layers vary from 5/90/5 to 33/33/33. The preferred ratios are from 15/70/15 to 25/50/25.

The thickness of film (A) generally varies from 15 to 35 μm, preferably from 20 to 30 μm, while the thickness of film (B) generally varies from 15 to 100 μm, preferably from 30 to 60 μm. The ratio between the thickness of film (A) and that of film (B) is not crucial, and is preferably equal to or less than 1, more preferably less than 1.

Films (A) and (B) can be produced by any known method for the production of film. The method generally preferred is coextrusion.

The composite films of the present invention are produced according to various techniques, for example by calendering films (A) and (B), using conventional process conditions (with or without adhesives, such as ethylene-vinyl acetate copolymer in ethyl acetate solvent or polyurethane adhesive), or by extrusion coating film (B) on film (A). The bonding processes used to obtain films (A) and (B) are also carried out using conventional process conditions.

It is possible to add to the polymers used to produce the films of the present invention various types of additives/fillers, such as nucleating agents, stabilizers and pigments commonly used for olefin polymers.

In order to analyze the polymers of the Examples the following analytical methods were used:

M.F.R.: ASTM D 1238, condition L;

intrinsic viscosity: in tetrahydronaphthaline at 135° C.;

melting point: DSC (Differential Scanning Calorimetry);

Dart test: ASTM D 1709.

Films produced in the Examples according to the invention have been tested in a Vertical Form Fill Seal packaging machine with seal bars temperatures ranging from 160° to 190° C., using 0.83 seconds seal time, in order to evaluate the heat sealability window in which the films of the present invention allow one to operate.

The evaluation of the impact resistance at low temperatures (Drop Test) is carried out on bags produced from the films of the present invention. Said bags, filled with water and then cooled until they reach the temperature of –20° C., are dropped to the ground from a height of 2.5 m., and the soundness of the bag is evaluated after the drop.

The following examples are given in order to illustrate and not limit the present invention.

COMPOSITION OF THE POLYMERS USED IN THE EXAMPLES

1) Random terpolymer of propylene with ethylene and butylene, containing 2% of ethylene and 5.5% of butylene; polymer isotactic index is 93, melting point 132° C., M.F.R. 6 g/10 min.

2) Propylene homopolymer with isotactic index of 96, melt point of 164° C., M.F.R. of 2 g/10 min.

3) Random copolymer of propylene with ethylene, the ethylene in a quantity of 2% by weight; isotactic index 94, melting point 152° C., M.F.R. 10 g/10 min.

4) Propylene copolymer: is a composition comprising (percentages by weight): (I) 49% of a crystalline propylene copolymer with 3.5% of ethylene; (II) 5.4% of a propylene/ethylene copolymer with 45.5% of ethylene, insoluble in xylene; and (III) 45.6% of an ethylene-propylene copolymer containing 21% of ethylene. The melting point of the composition is 145° C., M.F.R. is 6 g/10 min. Said copolymer is obtained by sequential copolymerization in the presence of highly specific Ziegler-Natta catalysts supported on active magnesium chloride.

EXAMPLE 1

Preparation of film (A): a triple-layer film is prepared by coextrusion (using three Brückner extruders, operating at a temperature of 280° C., and connected to a flat die), said film having an a/b/a structure, wherein layer (b) consists of homopolymer (2), while layers (a) consist of terpolymer (1). The thickness ratio of the layers is 1/23/1. The film obtained is then bioriented. The final thickness of the film is 25 μm.

Preparation of film (B): a triple-layer cast film is prepared by coextrusion (using three Dolci extruders, operating at a temperature of 250° C., and connected to a flat die), said film having an a/b/a structure and a thickness of 45 μm, wherein layer (b) consists of copolymer (4), while layers (a) consist of copolymer (1). The thickness ratio of the layers is 9/27/9.

Films (A) and (B) so prepared are calendered together using a double roller calender operating at ambient temperature. The adhesive used to bond the two films together during calendering is ethylene-vinyl acetate copolymer in ethylene acetate solvent.

EXAMPLE 2

A composite film of the same composition as the film of Example 1 is prepared, with the only difference being the thickness of the bioriented film, which for this Example is 20 μm.

EXAMPLE 3

A composite film of the same composition as the film of Example 1 is prepared, with the only difference being that the bioriented film of this Example consists of a single layer of the propylene homopolymer (2) with a thickness of 25 μm.

COMPARATIVE EXAMPLE 1c

A composite film is prepared by laminating a polyamide bioriented single-layer film, said polyamide being obtained by polymerizing 6,6 nylon, with a low density polyethylene single-layer blown film (M.F.R. of the polyethylene: 0.5–1 g/10 min). The thickness of the polyamide film is 25 μm, and that of the polyethylene film is 45 μm.

COMPARATIVE EXAMPLE 2c

A triple-layer cast film with an a/b/a structure, wherein layers (a) consist of copolymer (3) and layer (b) of copolymer (4), and wherein the thickness of the layers is 15, 40, 15 μm respectively, is prepared by coextruding the three films mentioned above.

Said film was then used in the packaging machine described above with operating temperature from 140° to 150° C.. At said temperature range the film was not workable, since either the film broke due to failure of the seal following melting of the entire film (operating temperature around 150° C.), or the two surfaces of the film did not seal (operating temperature around 140° C.).

The wideness of the sealability window shown by the examples of the invention is 25° C.

The results of the Drop test and Dart test for the films of the invention and the films obtained in comparative Examples 1 and 2 are shown in Table 1.

TABLE 1

|  | Examples and comparative Examples | | | | |
| --- | --- | --- | --- | --- | --- |
|  | 1 | 2 | 3 | 1c | 2c |
| Drop test | NB [1] | NB | NB | NB | — [2] |
| Dart test (66 cm) (g) | 750 | 940 | 860 | 650 | 650 |

[1] NB: no breaks;
[2] no bags could be produced from the films of Example 2c.

We claim:

1. A composite film comprising:
   A) a single- or multilayer bioriented film, wherein the single layer or at least one layer of said bioriented film is a propylene crystalline homopolymer; and
   B) a single- or multilayer cast film, wherein the single layer or at least one layer of said cast film is a composition comprising a component $B_1$ consisting of:
   I) 10–60 parts by weight of a propylene crystalline homopolymer with an isotactic index greater than 80, or a crystalline copolymer of propylene with at least one member selected from the group consisting of ethylene and a $C_4$–$C_8$ α-olefin, said crystalline copolymer containing more than 85% by weight of propylene and having an isotactic index greater than 85; II) 5–25 parts by weight of a copolymer fraction containing propylene and ethylene and insoluble in xylene at ambient temperature; III) 20–70 parts by weight of a copolymer of ethylene with at least one member selected from the group consisting of propylene and a $C_4$–$C_8$ α-olefin containing less than 70% by weight of ethylene, and soluble in xylene at ambient temperature.

2. The film of claim 1, wherein the bioriented film (A) is a triple-layer film wherein the outer layers comprise a random copolymer of propylene with at least one member selected from the group consisting of ethylene and a $C_4$–$C_8$ α-olefin.

3. The film of claim 1, wherein the cast film (B) is a triple-layer film where the outer layers comprise a random copolymer of propylene with at least one member selected from the group consisting of ethylene and a $C_4$–$C_8$ α-olefin.

4. The film of claim 3, wherein the bioriented film (A) is a single-layer film.

5. The film of claim 2, wherein the random copolymer is a propylene-ethylene copolymer.

6. The film of claim 2, wherein the random copolymer is a propylene-ethylene-1-butene terpolymer.

7. The film of claim 3, wherein the random copolymer is a propylene-ethylene copolymer.

8. The film of claim 3, wherein the random copolymer is a propylene-ethylene-1-butene terpolymer.

9. The film of claim 1, wherein at least one of fractions II and III of the cast film (B) contains a diene selected from the group consisting of 1,3-butadiene, 1,4-hexadiene, 1,5-hexadiene and 1-ethylidine-1-norbornene, said diene being present in an amount of 0.5 to 10 percent by weight based on the total weight of fractions II and III.

10. The film of claim 1, wherein said film possesses a combination of a broad heat sealability window and a Dart test value of at least 750 grams as measured according to ASTM D 1709.

11. The film of claim 10, wherein said heat sealability window is 25° C.

* * * * *